United States Patent [19]

Nishizawa et al.

[11] Patent Number: 5,227,861
[45] Date of Patent: Jul. 13, 1993

[54] APPARATUS FOR AND METHOD OF EVALUATING MULTILAYER THIN FILM

[75] Inventors: Seizi Nishizawa; Ryoichi Fukazawa, both of Tokyo; Tokuzi Takahashi, Ohsaka; Ryo Hattori, Itami, all of Japan

[73] Assignees: Mitsubishi Denki Kabushiki Kaisha; Jasco Corporation, both of Tokyo, Japan

[21] Appl. No.: 587,114

[22] Filed: Sep. 24, 1990

[30] Foreign Application Priority Data

Sep. 25, 1989 [JP] Japan .................................. 1-248850
Sep. 11, 1990 [JP] Japan .................................. 2-241439

[51] Int. Cl.⁵ .............................................. G01B 11/02
[52] U.S. Cl. .................................... 356/357; 356/346; 356/381
[58] Field of Search ............... 356/350, 357, 355, 381, 356/382, 346

[56] References Cited

U.S. PATENT DOCUMENTS

| 3,319,515 | 5/1967 | Flournoy | 356/350 |
| 3,899,253 | 8/1975 | Overhoff | 356/108 |
| 4,555,767 | 11/1985 | Case et al. | 364/563 |
| 4,748,329 | 5/1988 | Cielo et al. | 356/382 |
| 4,927,269 | 5/1990 | Keens et al. | 356/346 |

FOREIGN PATENT DOCUMENTS 59-105508 6/1984 Japan .
61-140806 6/1986 Japan .
61-200407 9/1986 Japan .
61-235707 10/1986 Japan .
63-302307 12/1988 Japan .
8700617 1/1987 World Int. Prop. O. .

OTHER PUBLICATIONS

IBM Technical Disclosure Bulletin, vol. 28, No. 2, Jul. 1985 "Measuring Thickness of Epitaxial Layer", pp. 493-495.
8164 Instruments and Experimental Techniques 27 (1984) Jul.-Aug. No. 4, Part 2, New York, pp. 1036-1040.

Primary Examiner—Samuel A. Turner
Assistant Examiner—LaCharles P. Keesee
Attorney, Agent, or Firm—Oblon, Spivak, McClelland, Maier & Neustadt

[57] ABSTRACT

An apparatus for and a method of evaluating a multilayer thin film of the present invention. An interference light beam in a predetermined wave number region is projected as a parallel beam onto a multilayer thin film sample and the interference light beam reflected by the sample is detected to find an interferogram. The interferogram is subject to Fourier transform, filtering and reverse Fourier transform so that a spatialgram is provided. Thereby the variation in incident angle of the light beam incident on the sample and in incident surface is reduced, and the spatialgram can be provided with accurate information of the multilayer thin film.

8 Claims, 8 Drawing Sheets

APPARATUS FOR AND METHOD OF EVALUATING MULTILAYER THIN FILM

BACKGROUND OF THE INVENTION

1. Field of the Invention

The present invention relates to an apparatus for and a method of evaluating a multilayer thin film and more particularly to an apparatus for and a method of evaluating a multilayer thin film capable of evaluating the thickness and the boundary state of each layer of the multilayer thin film formed by epitaxial growth of a semiconductor crystal, for example, in a non-destructive and non-contact manner.

2. Description of the Prior Art

Generally, an interference phenomenon of light is used for measuring the thickness of a thin film in a non-destructive and non-contact manner.

Figure 1:
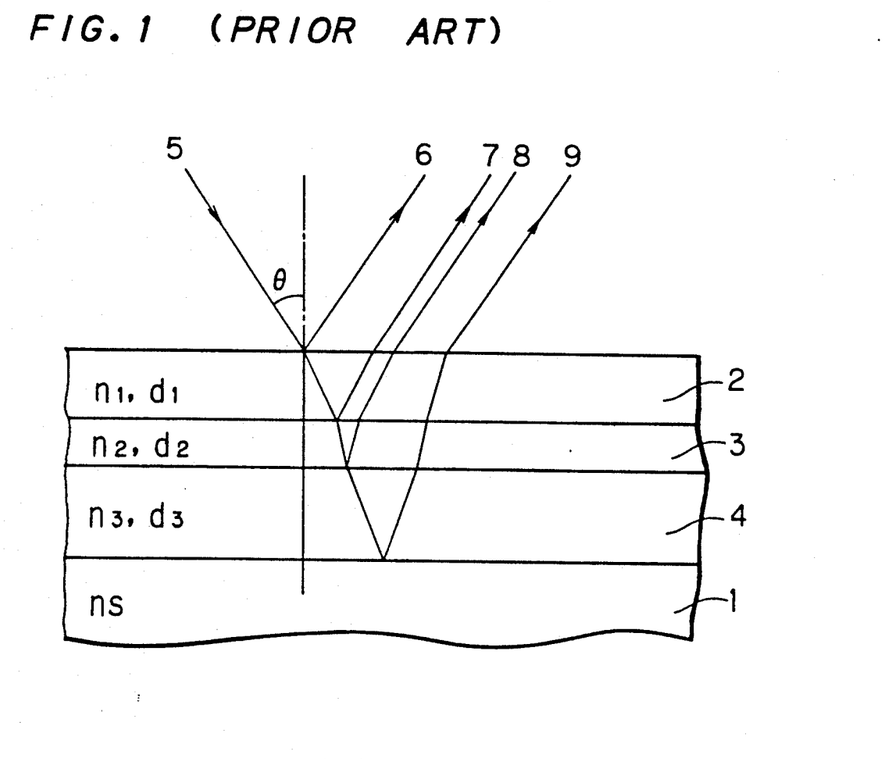
FIG. 1 is a typical view showing optical paths of a primary reflected light on each layer when a light beam is projected onto a multilayer thin film structure.

For example, a sample having semiconductor thin film layers 2, 3 and 4 formed on a semiconductor substrate 1 is shown in FIG. 1, on the surface of which a predetermined light beam 5 impinges at an incident angle $\theta$. Numerals 6. 7, 8 and 9 designate one-dimensional reflected light components on the surfaces of the thin film layers 2, 3 and 4 and the substrate 1, respectively. The thicknesses and refractive indices of the thin film layers 2, 3 and 4 are designated as (d1,n1), (d2,n2) and (d3,n3) respectively and the refractive index of the substrate 1 is designated as ns.

The reflected light components 6, 7, 8 and 9 on the surfaces of the respective thin film layers 2, 3 and 4 and the substrate 1 generate phase differences due to each optical path length and are synthesized to interfere with each other on the surface of the sample. When the i—th thin film layer from the top is defined as the i—th layer (where i is an integer), an optical path difference $\delta_i$ between the reflected light component 6 on the surface of the top layer and the reflected light component in the interface of the i—th layer and the (i+1)—th layer is expressed by the following formula:

$$\delta_i = \sum_{j=1}^{i} 2d_j \sqrt{n_j^2 - \sin^2\theta} \quad (1)$$

Thickness informations of the respective thin film layers 2, 3 and 4 can be obtained by analyzing a spatialgram of a reflected light beam formed by synthesizing the respective reflected light components having the phase differences $\delta_i$.

In general, a method of evaluating the film thickness from the analysis of an interference fringe of a reflection interference spectrum of the thin film has been conventionally adopted. This method is effective for the film structure consisting of a single layer, however, it cannot be practically used for the film structure consisting of plural layers because it is very difficult to separate and analyze each interference fringe.

Figure 2:
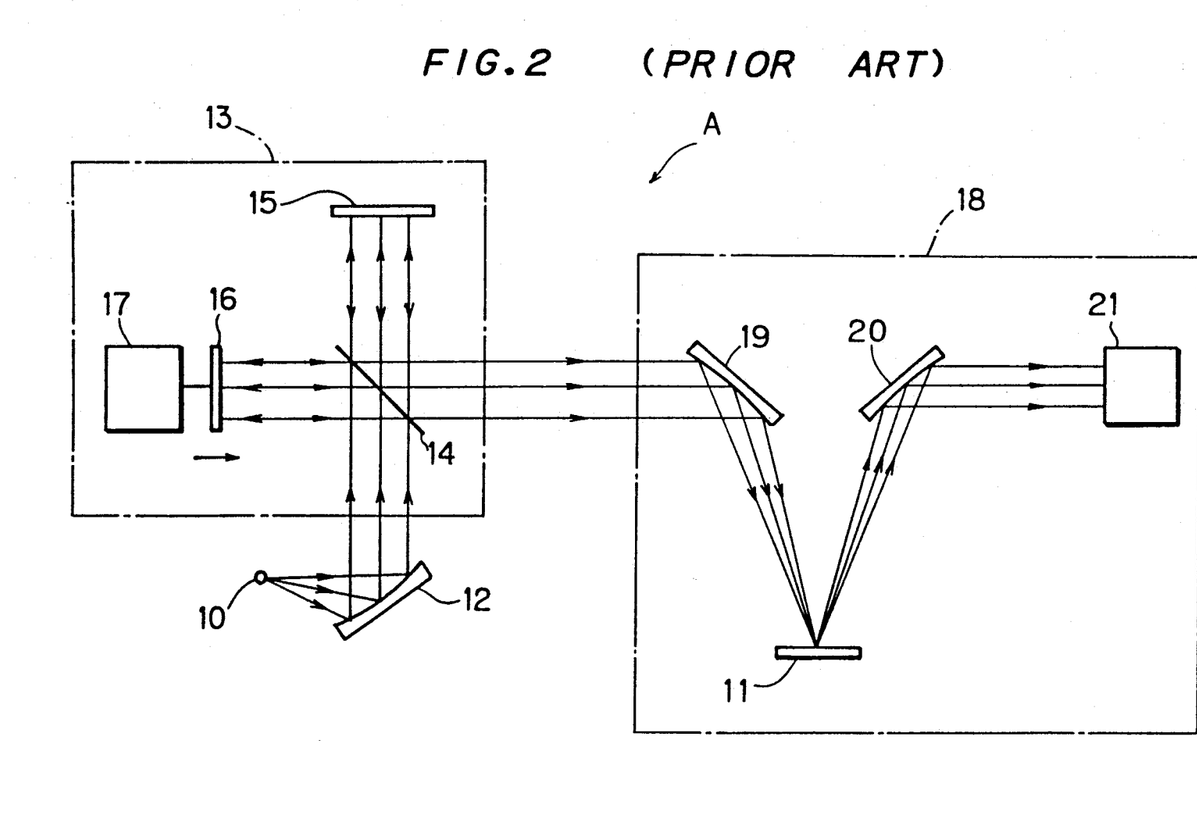
FIG. 2 is a schematic structural view showing an optical system of a conventional apparatus for evaluating a multilayer thin film.

Fourier transform infrared spectroscopic method (FTIR method) using Fourier analysis has been proposed as a method of measuring the thickness of &he multilayer thin film in a non destructive and non-contact manner. FIG. 2 is a schematic structural view showing an optical system A of an apparatus for evaluating the multilayer thin film using the FTIR method, and FIG. 3 is a general structural diagram of the apparatus.

Figure 3:
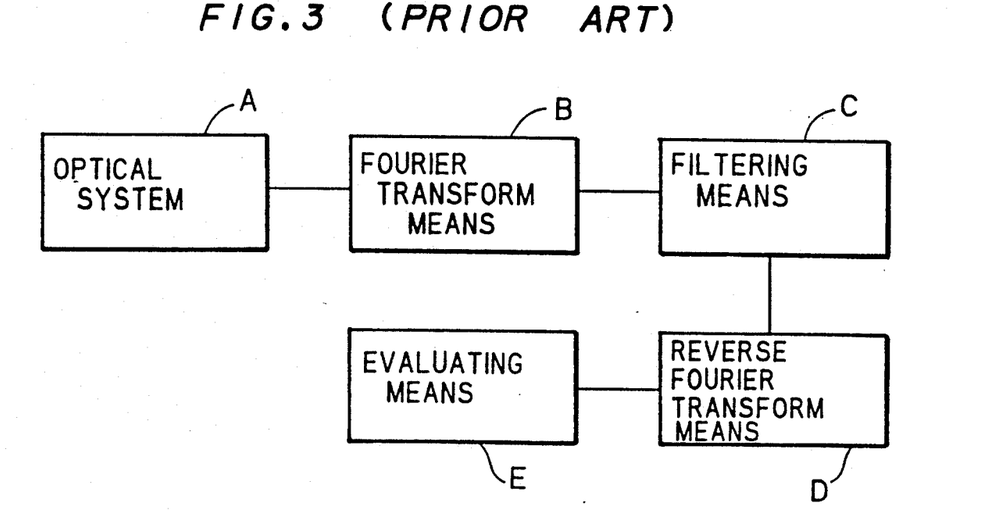
FIG. 3 is a general structural diagram of the conventional apparatus for evaluating the multilayer thin film.

As shown in FIGS. 2 and 3, an infrared light beam in a predetermined wave number region is emitted from a light source 10. The wave number region of &he infrared light beam is set according to the crystalline materials constituting the multilayer thin film of a sample for example, at 12000-2000 cm$^{-1}$ for AlGaAs series and at 8000-1OOO cm$^{-1}$ for InGaAsP series.

The light beam emitted from the light source 10 is transformed into a parallel light beam by an aspherical mirror 12 to be led to a Michelson interferometer 13.

The Michelson interferometer 13 comprises a beam splitter 14 for splitting the incident parallel light beam into two beams: a transmitted light beam and a reflected light beam, a fixed mirror 15 for reflecting the transmitted light beam of the beam splitter 14, a mobile mirror 16 for reflecting the reflected light beam of the beam splitter 14 and a driver 17 for transferring the mobile mirror 16 at a constant speed in the direction shown by the arrow of FIG. 2. The parallel light beam which is incident on the Michelson interferometer 13 is splitted by the beam splitter 14 into two beams: the transmitted light beam and the reflected light beam. After reflected by the fixed mirror 15 and the mobile mirror 16 respectively, the transmitted light beam and the reflected light beam return to the beam splitter 14 again and are synthesized to interfere with each other on the surface thereof. Since the mobile mirror 16 is transferred at a constant speed in the direction shown by the arrow of FIG. 2 by the driver 17, the transmitted light beam and the reflected light beam are synthesized while continuously varying the optical path differences thereof. Thus, the interference light to be synthesized on the beam splitter 14 is the light beam modulated with time according to the constant speed travelling of the mobile mirror 16. The interference light beam is led out toward an optical system 18 for lighting the sample.

The interference light beam led to the optical system 18 is converged on the surface of the sample 11 by an aspherical mirror 19 in order to improve the utilization efficiency of light beam energy. As described above, the light beam reflected by the sample 11 is subject to the interference caused by the film structure of the sample 11 and converged through an aspherical mirror 20 on the light-receiving surface of a photo detector 21.

Thus an interferogram (i.e., a spatialgram including noise) is measured by the photo detector 21. The interferogram measured by the photo detector 21 is subject to Fourier transform by Fourier transform means B to obtain a reflection spectrum. Next, filtering means C filters the reflection spectrum to remove wave number regions having no photometric sensitivity therefrom. The filtered reflection spectrum is subject to reverse Fourier transform by reverse Fourier transform means D to obtain a spatialgram excluding noise.

Figure 4:
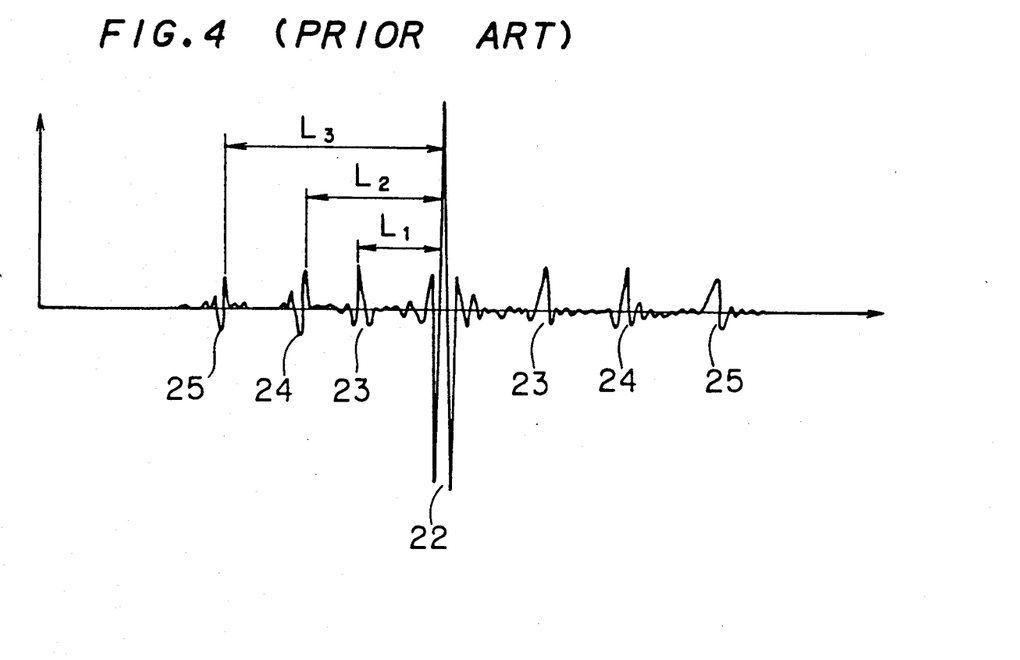
FIG. 4 shows an example of a spatialgram obtained by means of a multilayer thin film sample of FIG. 1.

FIG. 4 shows an example of the spatialgram provided by the use of the multilayer thin film sample of FIG. 1. In FIG. 4, the abscissa indicates a travelling distance of the mobile mirror 16 and the ordinate indicates an interference intensity of the reflected light beam. As shown in FIG. 4, in the spatialgram appear bursts 22-25 which is caused by the mutual intensification of total light due to the interference when the optical path difference by the travelling position of the mobile mirror 16 agrees with the optical path differences of the respective reflected light components indicative of the formula (1). The distances between the respective bursts correspond to the optical path differences of the respective reflected light components. In the example of FIG. 4, each side burst 23, 24 and 25 corresponding to the reflected light components 7, 8 and 9 (in FIG. 1) of the respective layers appears symmetrically, taking as an origin the center burst 22 corresponding to the reflected light component 6 on the surface of the sample (or the thin film layer 2). When the distances from the center burst 22 to the respective side bursts 23, 24 and 25 are designated as $L_i$ (i=1,2,3), the optical path differences $\delta_i$ of the respective reflected light components coincide with $2L_i$ indicative of the length of the both paths to the mobile mirror 16. Accordingly the following formula can be obtained from the aforesaid formula (1):

$$2L_i = \sum_{j=1}^{i} 2d_j \sqrt{n_j^2 - \sin^2\theta} \quad (2)$$

where the refractive indices $n_j$ and the incident angle $\theta$ are known. Therefore the thicknesses $d_i$ of the respective layers can be calculated by the formula (2) if the distances $L_i$ between the bursts are found by using the aforesaid spatialgram.

Evaluating means E of FIG. 3 can thus analyze the waveform of the aforesaid spatialgram to measure the thicknesses of the respective layers of the multilayer thin film. Furthermore, in addition to the thicknesses of the respective layers, boundary states of the respective layers can be evaluated from the steepnesses of the waveforms of the side bursts 23-25, for example.

In the conventional apparatus for evaluating the multilayer thin film constructed as above-mentioned an optical system of a converging system is used as the optical system 18 for lighting the sample as described above. The purposes of the adoption thereof are, by converging the inference light beam emitted from the Michelson interferometer 13 on the surface of the sample to increase the intensity of the detected light to be incident on the photo detector 21, to Improve the SN characteristic of the detection signal thereof, to intend for reducing measurement time, and the like.

Since the optical system 18 of the converging system is adopted, the incident angle $\theta$ of the light beam 5 projected on the surface of the sample in FIG. 1 is distributed continuously around this value in practice. As a result, variation in transmitted light path of the respective thin film layers 2-4 is generated, and incident wave surfaces are distributed in a certain range. Thus the interference intensity is deteriorated and the burst shapes on the spatialgram are blurred and wide, so that the deterioration in resolution, in measurement accuracy and the like is caused. Particularly in measuring the thin film, because the spatialgram shows a quite smooth intensity distribution with respect to the wave number, a slight change in the intensity distribution due to measurement errors and the like results in the change in the waveform of the spatialgram. As a result, the burst positions are deviated and the adjacent bursts overlap each other, so that the variation in film thickness measured values is caused and the measuring limit thickness of the thin film grows large.

Accordingly the formulas (1) and (2) cannot be used in an intact form. It is necessary to consider the distribution of the incident angle $\theta$ and deflection characteristics of reflection.

In the conventional apparatus for evaluating the multilayer thin film, the reflection spectrum is transformed into the spatialgram in the reverse Fourier transform means D by cosine reverse Fourier transform by means of a cosine term shown in the following formula (3):

$$S(X) = \int_{\sigma s}^{\sigma e} R(\sigma) \cdot \cos(2\pi\sigma X) \cdot f(\sigma) d\sigma \quad (3)$$

where $R(\sigma)$: reflected light intensity, $f(\sigma)$: filtering function, $\sigma$: wave number (1/cm), X: distance (cm), and $\sigma s/\theta e$: photometrical wave number limits.

Figure 5:
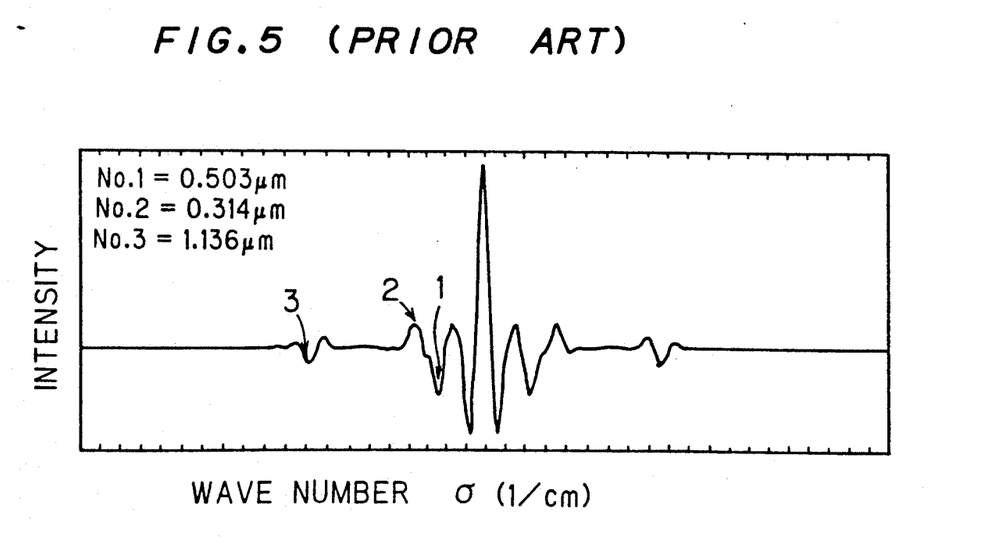
FIGS. 5 and 6 show spatialgrams obtained by conventional cosine reverse Fourier transform respectively.

FIG. 5 shows another example of the spatialgram, in which the respective thin film layers 2, 3 and 4 of the sample are 0.503 µm, 0.314 µm and in thickness respectively. As shown in FIG. 5, burst peaks can be seen in the positions corresponding to the interfaces of the respective layers.

Figure 6:
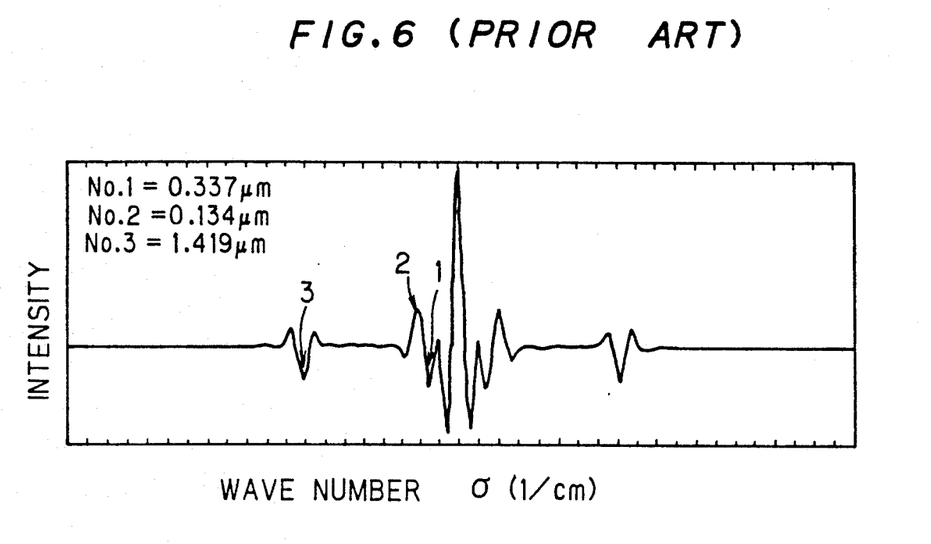

As above-mentioned, since the reflection spectrum is subject to the cosine reverse Fourier transform having only the cosine term, the burst waveform which appears on the spatialgram can show a reverse phase having upward/downward burst peaks according to filtering conditions (e.g., the form of the filtering function $f(\sigma)$ and a filtering wave number region). When the film to be measured is thin, the burst waveforms having upward and downward peaks overlap each other as shown in the spatialgram of FIG. 6, for example. As a result, each peak is swallowed up by a synthesized waveform so that it is difficult to read the peak positions.

In the method of measuring the film thickness by means of the FTIR method, a photometrical wave number range ($\sigma s - \sigma e$) is a major factor determining the thin film measuring limits. In the framework of the photometrical wave number range determined mainly from a photometrical optical system, it is important to read the peak positions from the burst waveforms on the spatialgram. However, in the prior art, the burst waveforms themselves have an unstable factor of the upward/downward phase, which is a factor providing the thin film thickness measurement with a limitation.

SUMMARY OF THE INVENTION

The present invention is directed to an apparatus for and a method of evaluating a multilayer thin film in which the thickness of the multilayer thin film and the boundary state of each layer are evaluated in a nondestructive and non-contact manner.

The apparatus for evaluating the multilayer thin film according to a first aspect of the present invention comprises: a first optical system for synthesizing two light beams in a predetermined wave number region while continuously varying optical path differences thereof to produce an interference light beam., a second optical system for projecting onto a multilayer thin film sample the interference light beam emitted from the first optical system as a parallel beam having a predetermined beam diameter and detecting the interference light beam reflected by the sample to provide an interferogram., Fourier transform means for performing Fourier transform on the interferogram to provide a reflection spectrum; filtering means for filtering the reflection spectrum; reverse Fourier transform means for performing reverse Fourier transform on the reflection spectrum filtered to provide a spatialgram; and evaluating means for evaluating the multilayer thin film on the basis of the spatialgram.

The apparatus for evaluating the multilayer thin film according to a second aspect of the present invention comprises: an optical system for projecting onto a multilayer thin film sample an interference light beam obtained by synthesizing two light beams in a predetermined wave number region while continuously varying optical path differences thereof and detecting the interference light beam reflected by the sample to provide an interferogram; Fourier transform means for performing Fourier transform on the interferogram to provide a reflection spectrum; filtering means for filtering the reflection spectrum; complex power reverse Fourier transform means for performing complex power reverse Fourier transform on the reflection spectrum filtered to provide a spatialgram; and evaluating means for evaluating the multilayer thin film on the basis of the spatialgram.

The method of evaluating the multilayer thin film according to a third aspect of the present invention comprises: a first step of synthesizing two light beams in a predetermined wave number region while continuously varying optical path differences thereof to produce an interference light beam; a second step of projecting onto a multilayer thin film sample the interference light beam produced by the first step as a parallel beam having a predetermined beam diameter and detecting the interference light beam reflected by the sample to provide an interferogram; a third step of performing Fourier transform on the interferogram to provide a reflection spectrum; a fourth step of filtering the reflection spectrum; a fifth step of performing reverse Fourier transform on the reflection spectrum filtered to provide a spatialgram; and a sixth step of evaluating the multilayer thin film on the basis of the spatialgram.

The method of evaluating the multilayer thin film according to a fourth aspect of the present invention comprises: a first step of projecting onto a multilayer thin film sample an interference light beam obtained by synthesizing two light beams in a predetermined wave number region while continuously varying optical path difference thereof and detecting the interference light beam reflected by the sample to provide an interferogram; a second step of performing Fourier transform on the interferogram to provide a reflection spectrum; a third step of filtering the reflection spectrum; a fourth step of performing complex power reverse Fourier transform on the reflection spectrum filtered to provide a spatialgram., and a fifth step of evaluating the multilayer thin film on the basis of the spatialgram.

Therefore, an object of the present invention is to provide an apparatus for and a method of evaluating a multilayer thin film capable of evaluating the multilayer thin film more accurately and stably in a non-destructive and non-contact manner.

According to the apparatus for evaluating the multilayer thin film in the first aspect and the method of evaluating the multilayer thin film in the third aspect, the interference light beam is formed into the parallel beam having the predetermined beam diameter and is incident on the sample surface, so that the variation in the incident angle $\theta$ with respect to the sample and in the incident surface can be remarkably reduced. As a result, the transmitted light paths in the multilayer thin film approach an ideal system shown in FIG. 1 infinitely, and the spatialgram to be obtained has accurate information of the multilayer thin film. Therefore, the formulas (1) and (2) can be used in an intact form for the analysis.

According to the apparatus for evaluating the multilayer thin film in the second aspect and the method of evaluating the multilayer thin film in the fourth aspect, both even and odd functional components in the spatialgram appearing in the limited wave number range of the reflection spectrum can be accurately transformed by the complex transform. All burst waveforms on the spatialgram show the same phase by the power transform. As a result, compared with the case of performing the cosine reverse Fourier transform, more information can be introduced in the same photometrical wave number range so that the unstable factor of the burst waveform phase is eliminated. Therefore, the separation accuracy of the burst waveform and the thin film measuring limits are improved.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 7:
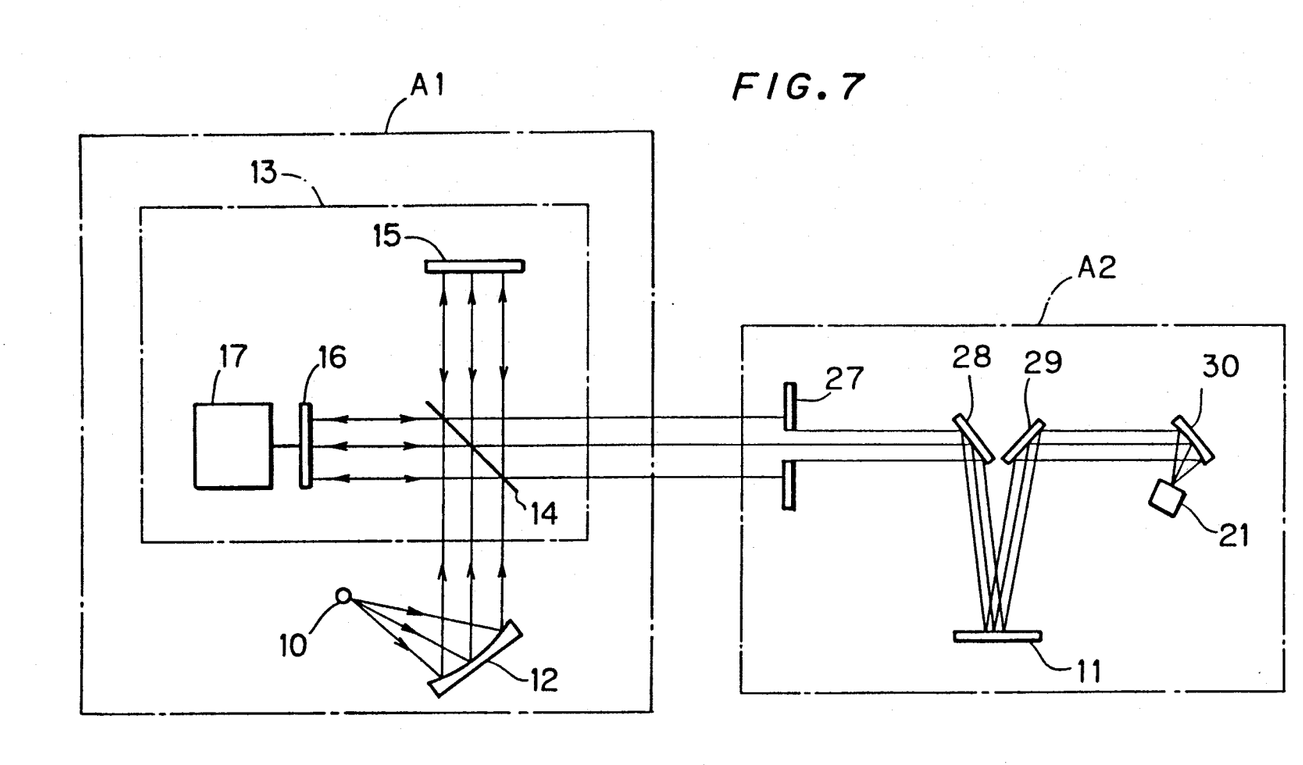
FIG. 7 is a schematic structural view showing an optical system of an apparatus for evaluating a multilayer thin film according to a first preferred embodiment of the present invention.
Figure 8:
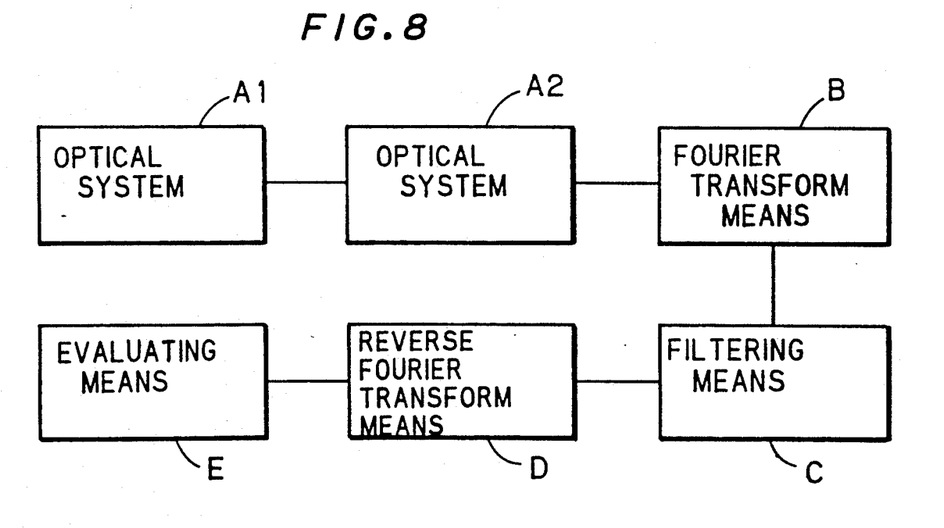
FIG. 8 is a general structural diagram of the apparatus for evaluating the multilayer thin film according to the first preferred embodiment of the present invention.

FIG. 7 is a schematic structural view showing an optical system of an apparatus for evaluating a multilayer thin film according to a first preferred embodiment of the present invention, and FIG. 8 is a general structural diagram thereof.

As shown in FIGS. 7 and 8, the apparatus for evaluating the multilayer thin film comprises a first optical system A1 and a second optical system A2.

The first Optical system A1 is composed of a light source 10, an aspherical mirror 12 and a Michelson interferometer 13, and these components are similar to the corresponding parts of FIG. 2. The wave number region of the light source 10 is, however, 32000−0 cm$^{-1}$ which is wider than the conventional region.

The second optical system A2 projects an interference light beam led out from the Michelson interferometer 13 in the first optical system A1 as a parallel beam having a predetermined beam diameter onto a sample 11 and detects the interference light beam reflected by the sample in a photo detector 21 to provide an interferogram. The second optical system A2 comprises an aperture mask 27, plane mirrors 28 and 29, an aspherical mirror 30 and the photo detector 21.

The interference light beam led out from the Michelson interferometer 13 is transformed by the aperture mask 27 into a parallel beam having a diameter of several millimeters suited for thin film measurement and is projected through the plane mirror 28 onto the sample 11. The light reflected by the sample 11 is regularly reflected by the plane mirror 29 and converged by the aspherical mirror 30 on the light-receiving portion of the photo detector 21 to be transformed into an electric signal therein. Thus the interferogram can be measured.

The following processings are similar to those of the prior art. That is, the interferogram measured by the photo detector 21 is Fourier-transformed by Fourier transform means B so that a reflection spectrum is obtained. After the reflection spectrum is filtered to remove wave number regions having no photometric sensitivity therefrom by filtering means C, cosine reverse Fourier transform is performed thereon by reverse Fourier transform means D to obtain a spatialgram. By the use of the spatialgram thus obtained, evaluating means E evaluates the thickness of the multilayer thin film and the like.

When Fourier-transform spectroscopic analysis is performed in the apparatus for evaluating the multilayer thin film, a data sampling interval is narrowed to one-fourth and further one-eighth of He-Ne laser wavelength (6328 Å) for enabling multilayer film separation analysis, although one half thereof has been conventionally used. On the other hand, the spectrum calculation wave number region is expanded to 32000−0 cm$^{-1}$.

Other structure of the apparatus according to the first preferred embodiment of the present invention is similar to that of the conventional apparatus, and hence the same numerals are assigned to the same or corresponding parts and the redundant description &hereof is omitted.

According to the apparatus of this preferred embodiment, the interference light beam led out from the first optical system A1 is formed into the parallel beam having the predetermined beam diameter and is incident on the surface of the sample 11 by the second optical system A2, so that the variation in the incident angle $\theta$ and in the incident surface is remarkably reduced. As a result, transmitted light paths in the multilayer thin film can approach an ideal system shown in FIG. 1 infinitely, and the spatialgram to be obtained (in FIG. 4) can provide accurate information of the multilayer thin film. Hence, the thickness and the boundary state of each layer in the multilayer thin film can be evaluated accurately. In addition, when the Fourier-transform spectroscopic analysis is performed, the data sampling interval with respect to the travelling of the mobile mirror 16 is shortened, and the data calculation wave number region is widely expanded. Therefore, the thickness of each layer of the quite thin multilayer film can be accurately analyzed.

Figure 9:
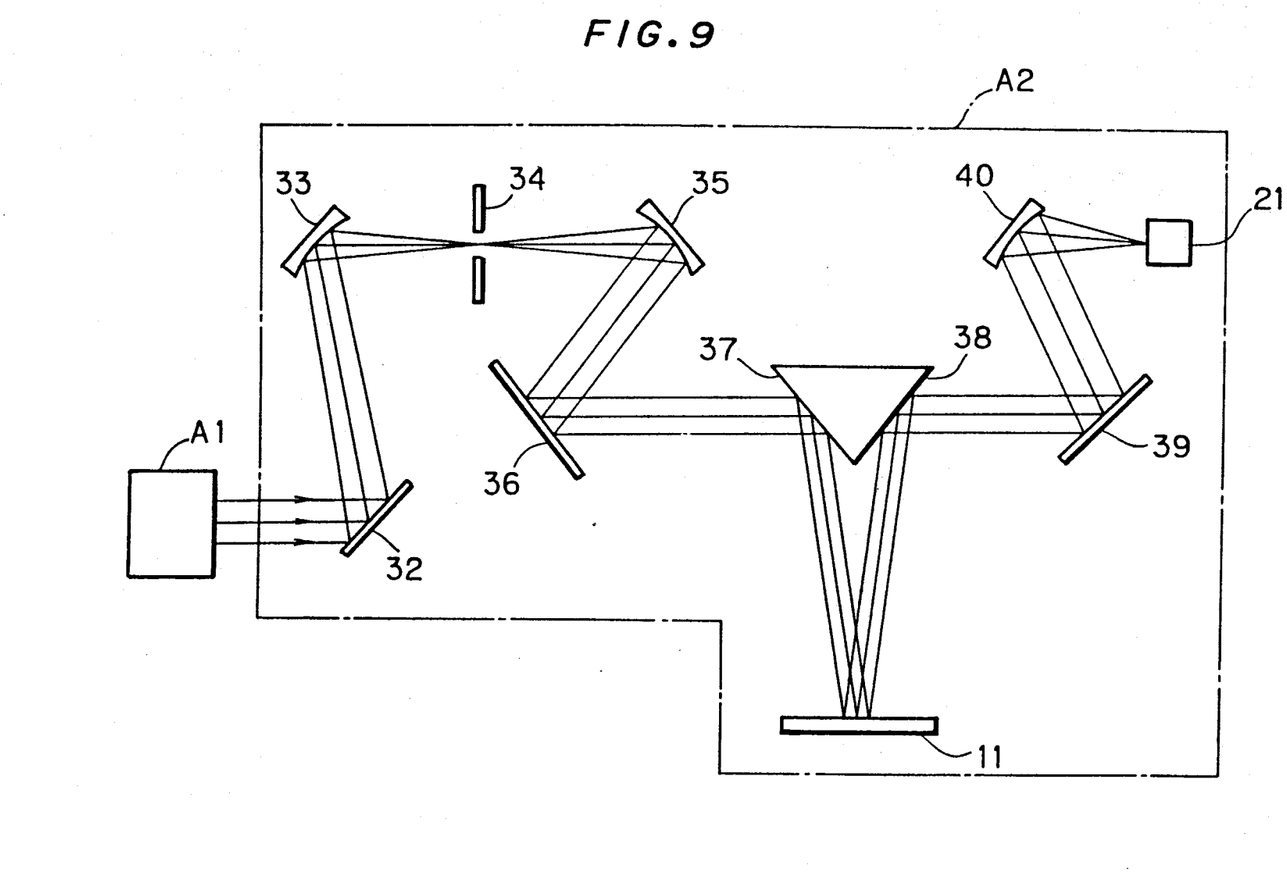
FIG. 9 is a schematic structural view showing the optical system of the apparatus for evaluating the multilayer thin film according to a second preferred embodiment of the present invention.

FIG. 9 is a schematic structural view showing the optical system of the apparatus for evaluating the multilayer thin film according to a second preferred embodiment of the present invention.

As shown in FIG. 9, the apparatus comprises the second optical system A2 for projecting the interference light beam led out from the first optical system A1 onto the sample 11 as a parallel beam having a predetermined beam diameter.

The second optical system A2 comprises plane mirrors 32, 36, 37, 38 and 39, aspherical mirrors 33, 35 and 40, and an aperture mask 34.

The interference light beam led out from the first optical system A1 is, after regularly reflected by the plane mirror 32, converged once by the aspherical mirror 33. The converged light beam passes through the aperture mask 34 for improving collimation to be transformed into a parallel beam again by the aspherical mirror 35. The parallel beam is projected through the plane mirrors 36 and 37 onto the sample 11. The interference light beam reflected by the sample 11 is, after regularly reflected by the plane mirrors 38 and 39, converged on the light-receiving surface of the photo detector 21 by the aspherical mirror 40.

Other structure of the second preferred embodiment is similar to that of the first preferred embodiment. The same effect as the first preferred embodiment can be obtained with the second preferred embodiment.

Figure 10:
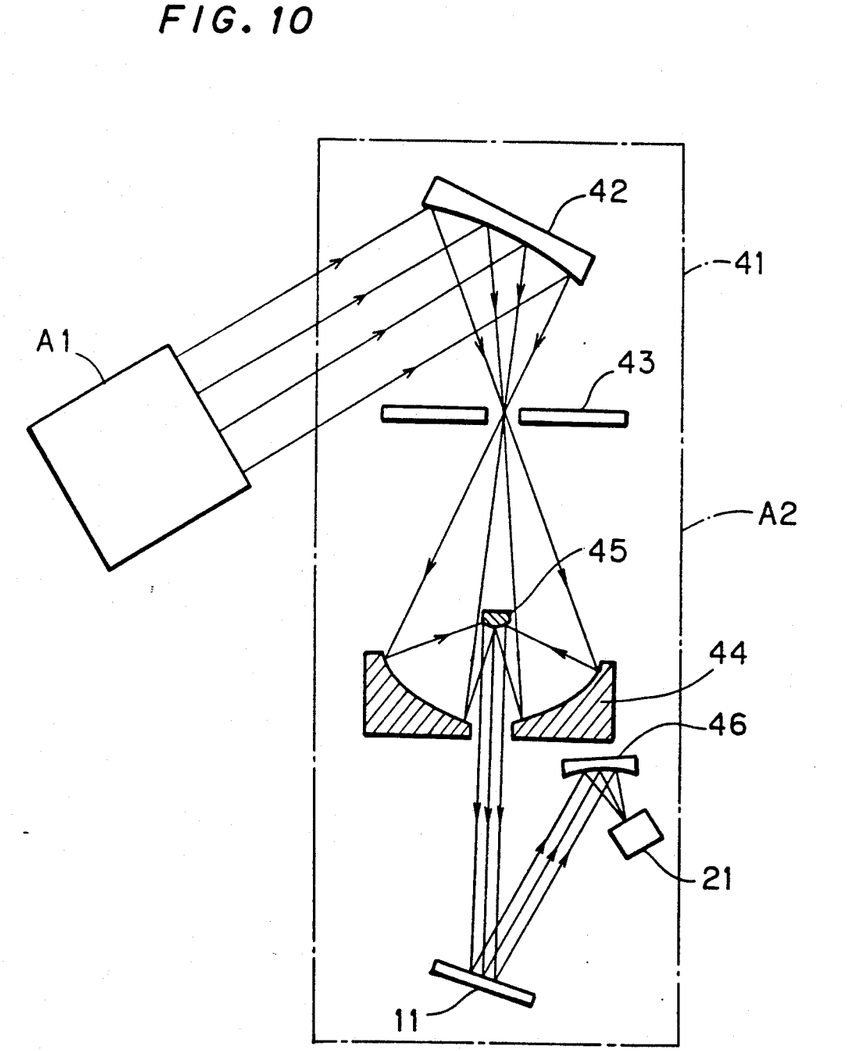
FIG. 10 is a schematic structural view showing the optical system of the apparatus for evaluating the multilayer thin film according to a third preferred embodiment of the present invention.

FIG. 10 is a schematic structural view showing the optical system of the apparatus for evaluating the multilayer thin film according to a third preferred embodiment of the present invention.

As shown in FIG. 10, the apparatus uses an optical system for lighting having Cassegrain structure as the second optical system A2, whereby the interference light beam led out from the first optical system A1 can be converged in a wider range to be transformed into a parallel beam.

The second optical system A2 comprises aspherical mirrors 42 and 46, an aperture mask 43, a converging mirror 44 having an elliptic reflecting surface and a hyperboloidal mirror 45 (or approximatively a convex mirror).

The interference light beam led out from the first optical system A1 is converged once by the aspherical mirror 42 and passes through the aperture mask 43 for improving collimation. The converging position by the aspherical mirror 42 corresponds to one focus position of the elliptic reflecting surface of the converging mirror 44. In the other focus position thereof the hyperboloidal mirror 45 is disposed. The light beam diverged after passing through the aperture mask 43 is converged again by the converging mirror 44 and reflected by the hyperboloidal mirror 45 to be transformed into a parallel beam thereon. The parallel beam thus formed is projected onto the sample 11, and the interference light beam reflected by the sample 11 is converged on the light-receiving surface of the photo detector 21 by the aspherical mirror 46.

Other structure of the third preferred embodiment is similar to that of the first preferred embodiment. The same effect as the first preferred embodiment can be obtained with the third preferred embodiment.

In the above-mentioned first to third preferred embodiments, the Fourier-transform spectroscopic analysis is performed solely on the interferogram of the multilayer thin film sample to provide the spatialgram. However, the spatialgram may be provided by the method described hereinafter. Prior to the measurement of the interferogram of the multilayer thin film sample 11, for example, another interferogram is measured in the same manner as above-mentioned by the use of a standard sample in which gold is deposited over a semiconductor substrate and is stored in a memory. The interferogram data of the standard sample is read out from the memory as required and is Fourier-transformed to find the reflection spectrum thereof. The reflection spectrum of the standard sample is subtracted from the reflection spectrum of the multilayer thin film sample to find a difference spectrum. The difference spectrum is filtered by the data processing to remove noise wave number regions therefrom. The reverse Fourier transform is performed on the filtered difference spectrum to obtain the spatialgram. By means of this method, the spatialgram in which the center burst is eliminated can be obtained thereby the multilayer thin film being evaluated more accurately.

Figure 11:
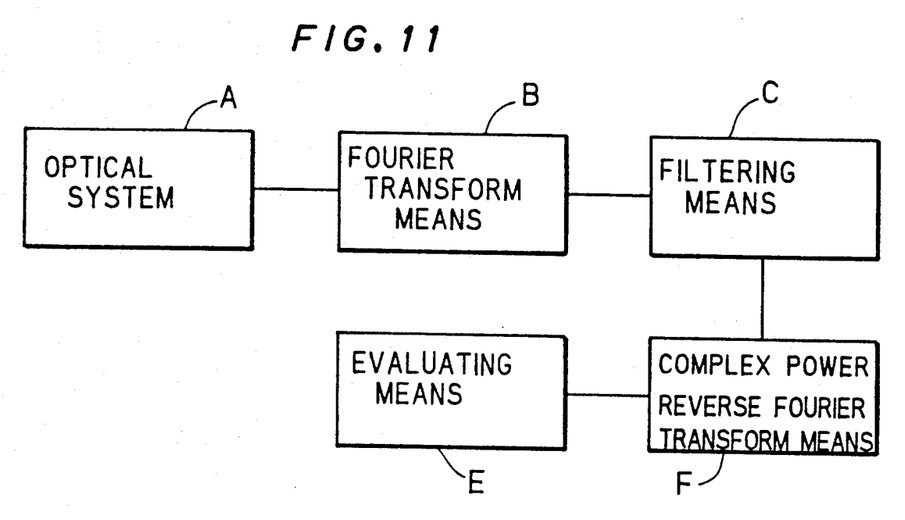
FIG. 11 is a general structural diagram of the apparatus for evaluating the multilayer thin film according to a fourth preferred embodiment of the present invention.

FIG. 11 is a general structural diagram of the apparatus for evaluating the multilayer thin film according to a fourth preferred embodiment of the present invention.

In FIG. 11, the reference characters A to C and E designate the same parts as those of the conventional apparatus.

In the preferred embodiment, the filtered reflection spectrum is transformed by means of complex power reverse Fourier transform means F to provide the spatialgram. The complex transform is a common basic technique in Fourier-transform spectroscopy. However, there has been no example which applies the complex power transform to the case where the reflection spectrum is reverse Fourier-transformed into the spatialgram for the purpose of measuring the thickness of the semiconductor multilayer thin film.

In the complex power reverse Fourier transform means F according to the present invention, when the reflection spectrum is reverse-Fourier-transformed into the spatialgram, the complex power transform by means of $e(j2\pi\sigma x)$ including a cosine term and a sine term as shown in the following formula (4) is performed:

$$S'(X) = \left| \int_{\sigma s}^{\sigma e} R(\sigma) \cdot e(j2\pi\sigma x) \cdot f(\sigma) d\sigma \right| \quad (4)$$

$$= \sqrt{\left\{ \int_{\sigma s}^{\sigma e} R(\sigma) \cdot \cos(2\sigma) \cdot f(\sigma) d\sigma \right\}^2 + \left\{ \int_{\sigma s}^{\sigma e} R(\sigma) \cdot \sin(\sigma) \cdot f(\sigma) d\sigma \right\}^2}$$

where $R(\sigma)$ reflected light intensity, $f(\sigma)$: filtering function, $\sigma$: wave number (1/cm), X: distance (cm), and $\sigma s/\sigma e$: photometrical wave number limits.

Figure 12:
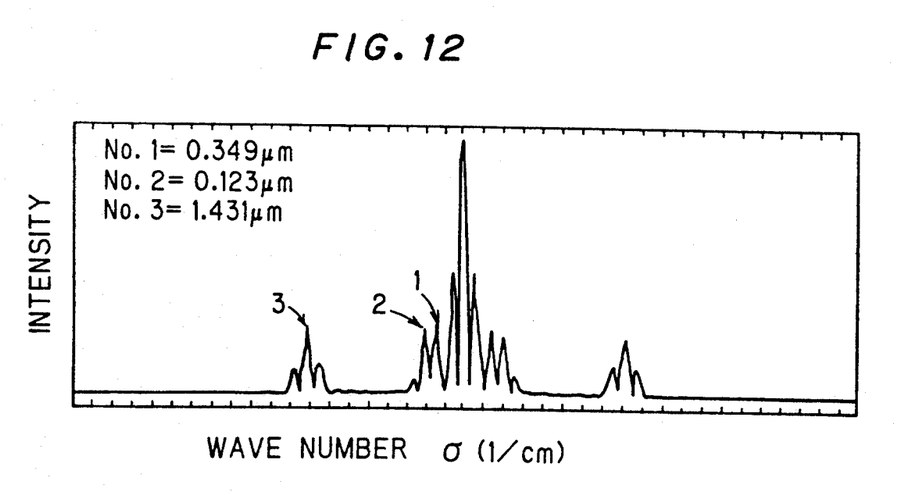
FIG. 12 shows a spatialgram obtained by complex power reverse Fourier transform according to the fourth preferred embodiment of the present invention.

Next, the film thickness of the sample having a semiconductor multilayer thin film formed on a semiconductor substrate is measured to be evaluated. The used sample comprises $Al_xGa_{1-x}As$ (x=0.5, 0.35 μm in thickness), $Al_xGa_{1-x}As$ (x=0.1, 0.1 μm in thickness) and $Al_xGa_{1-x}As$ (x=0.5, 1.4 μm in thickness) as the semiconductor thin films 2, 3 and 4 of FIG. 1 respectively formed on a GaAs substrate as the semiconductor substrate of FIG. 1. The spatialgram obtained by means of the complex power reverse Fourier transform means F according to the present invention is shown in FIG. 12, and the spatialgram obtained by means of the conventional cosine reverse Fourier transform means D is shown in FIG. 6. In the cosine reverse Fourier transform shown in FIG. 6, since two burst waveforms overlap each other to be an unsymmetrical waveform, it is difficult to read the peak positions. The unsymmetrical waveform is sensitive to the filtering conditions in the reverse Fourier transform and changes its shape subtly, so that it is practically impossible to find the peaks from this waveform to obtain the film thickness. On the other hand, in the spatialgram shown in FIG. 12 according to the present invention, although the intervals between the peak positions are about 0.1 μm, the burst waveforms are obviously separated. The spatialgram shown in FIG. 12 is a stable spatialgram sufficient to use for the practical film thickness measurement. Compared with the spatialgram by means of the conventional cosine reverse Fourier transform, since more information is provided in the spatialgram by means of the complex power reverse Fourier transform and each burst waveform becomes the same phase, and therefore the measuring accuracy of the film thickness can be improved.

In the aforesaid preferred embodiment, the first optical system A1 and the second optical system A2 of FIG. 8 may be substituted for the optical system A of FIG. 11. In such a case, the thin film can be measured to the thickness of about 0.1 μm under the photometrical conditions under which 0.2 μm is the limit in the apparatus of FIG. 8.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. An apparatus for evaluating a multilayer thin film, comprising:

a first optical system for synthesizing two light beams in a predetermined wave number region while continuously varying optical path differences thereof to produce an interference light beam;

a second optical system for projecting onto a multilayer thin film sample said interference light beam emitted from said first optical system as a parallel beam having a predetermined beam diameter and detecting the interference light beam reflected by said sample to provide an interferogram., Fourier transform means for performing Fourier transform on said interferogram to provide a reflection spectrum;

filtering means for filtering said reflection spectrum;

reverse Fourier transform means for performing reverse Fourier transform on said reflection spectrum filtered to provide a spatialgram; and evaluating means for evaluating the multilayer thin film on the basis of said spatialgram.

2. The apparatus for evaluating a multilayer thin film according to claim 1, wherein said second optical system further comprises:
an aperture mask for transforming the interference light beam emitted from said first optical system into a parallel beam having a predetermined beam diameter,
a first plane mirror for reflecting and leading said parallel beam to said multilayer thin film sample;
a second plane mirror for reflecting said interference light beam reflected by said multilayer thin film sample; and
an aspherical mirror for converging said interference light beam reflected by said second plane mirror on a photo detector.

3. The apparatus for evaluating a multilayer thin film according to claim wherein said second optical system further comprises:
a first plane mirror for reflecting the interference light beam emitted from said first optical system;
a first aspherical mirror for converging said interference light beam reflected by said first plane mirror;
an aperture mask disposed in a converging position of said interference light beam;
a second aspherical mirror for transforming said interference light beam passing through said aperture mask into a parallel beam;
a first plane mirror group for sequentially reflecting and leading said parallel beam to said multilayer thin film sample;
a second plane mirror group for sequentially reflecting said interference light beam reflected by said multilayer thin film sample; and
a third aspherical mirror for converging said interference light beam emitted from said second plane mirror group on a photo detector.

4. The apparatus for evaluating a multilayer thin film according to claim wherein said second optical system further comprises:
a first aspherical mirror for converging the interference light beam emitted from said first optical system;
an aperture mask disposed in a converging position of said interference light beam;
a converging mirror having an elliptic reflecting surface for reflecting the interference light beam having passed through said aperture mask on said reflecting surface to converge said interference light b ⓡam on one focus position of the reflecting surface;
a hyperboloidal mirror disposed in one focus position of said converging mirror for transforming said interference light beam reflected by said converging mirror into a parallel beam to lead the parallel beam to said multilayer thin film sample; and
a second aspherical mirror for converging said interference light beam reflected by said multilayer thin film sample on a photo detector.

5. An apparatus for evaluating a multilayer thin film, comprising:

an optical system for projecting onto a multilayer thin film sample an interference light beam obtained by synthesizing two light beams in a predetermined wave number region while continuously varying optical path differences thereof and detecting the interference light beam reflected by said sample to provide an interferogram;
Fourier transform means for performing Fourier transform on said interferogram to provide a reflection spectrum;
filtering means for filtering said reflection spectrum;
complex power reverse Fourier transform means for performing complex power reverse Fourier transform on said reflection spectrum filtered to provide a spatialgram; and
evaluating means for evaluating the multilayer thin film on the basis of said spatialgram.

6. The apparatus for evaluating a multilayer thin film according to claim 5, wherein said reverse Fourier transform is expressed by the following formula:

$$S'(X) = \left| \int_{\sigma s}^{\sigma e} R(\sigma) \cdot e^{(j2\pi\sigma x)} \cdot f(\sigma)d\sigma \right|$$

$$= \sqrt{\left( \int_{\sigma s}^{\sigma e} R(\sigma) \cdot \cos(2\sigma) \cdot f(\sigma)d\sigma \right)^2 + \left( \int_{\sigma s}^{\sigma e} R(\sigma) \cdot \sin(\sigma) \cdot f(\sigma)d\sigma \right)^2}$$

where $R(\sigma)$: reflected light intensity, $f(J)$: filtering function, $\sigma$: wave number (1/cm), X: distance (cm), and $\sigma s/\sigma e$: photometrical wave number limits.

7. A method of evaluating a multilayer thin film, comprising:
a first step of synthesizing two light beams in a predetermined wave number region while continuously varying optical path differences thereof to produce an interference light beam;
a second step of projecting onto a multilayer thin film sample said interference light beam produced by said first step as a parallel beam having a predetermined beam diameter and detecting the interference light beam reflected by said sample to provide an interferogram;
a third step of performing Fourier transform on said interferogram to provide a reflection spectrum;
a fourth step of filtering said reflection spectrum;
a fifth step of performing reverse Fourier transform on said reflection spectrum filtered to provide a spatialgram; and
a sixth step of evaluating the multilayer thin film on the basis of said spatialgram.

8. A method of evaluating a multilayer thin film, comprising:
a first step of projecting onto a multilayer thin film sample an interference light beam obtained by synthesizing two light beams in a predetermined wave number region while continuously varying optical path differences thereof and detecting the interference light beam reflected by said sample to provide an interferogram;
a second step of performing Fourier transform on said interferogram to provide a reflection spectrum;
a third step of filtering said reflection spectrum;
a fourth step of performing complex power reverse Fourier transform on said reflection spectrum filtered to provide a spatialgram; and
a fifth step of evaluating the multilayer thin film on the basis of said spatialgram.

* * * * *